United States Patent
Jang

(10) Patent No.: US 12,056,389 B2
(45) Date of Patent: Aug. 6, 2024

(54) COMPUTING SYSTEM OF SETTING DEVICE CONFIGURATION AND OPERATING METHOD THEREOF

(71) Applicant: SK hynix Inc., Gyeonggi-do (KR)

(72) Inventor: In Jong Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 83 days.

(21) Appl. No.: 17/577,215

(22) Filed: Jan. 17, 2022

(65) Prior Publication Data
US 2023/0058630 A1 Feb. 23, 2023

(30) Foreign Application Priority Data
Aug. 18, 2021 (KR) .................. 10-2021-0109027

(51) Int. Cl.
*G06F 3/06* (2006.01)
*G06F 8/65* (2018.01)

(52) U.S. Cl.
CPC .......... *G06F 3/0656* (2013.01); *G06F 3/0604* (2013.01); *G06F 3/0632* (2013.01); *G06F 3/0679* (2013.01); *G06F 8/65* (2013.01)

(58) Field of Classification Search
CPC .... G06F 3/0656; G06F 3/0604; G06F 3/0679; G06F 8/65; G06F 13/1694; G06F 2206/1008; G06F 3/0605; G06F 3/0629; G06F 3/0632
See application file for complete search history.

(56) References Cited

U.S. PATENT DOCUMENTS

| | | | | |
|---|---|---|---|---|
| 6,334,174 B1 * | 12/2001 | Delp | ............... | G06F 13/1694 |
| | | | | 365/194 |
| 11,079,945 B2 * | 8/2021 | Irshad | ............... | G06F 3/0604 |
| 2012/0311279 A1 | 12/2012 | Hong et al. | | |
| 2014/0359196 A1 * | 12/2014 | Ragland | ............... | G06F 13/385 |
| | | | | 711/102 |
| 2020/0097200 A1 | 3/2020 | Striegel et al. | | |

* cited by examiner

*Primary Examiner* — Idriss N Alrobaye
*Assistant Examiner* — Richard B Franklin
(74) *Attorney, Agent, or Firm* — IP & T GROUP LLP

(57) ABSTRACT

A computing system includes host and a storge device. The host includes a host memory and a user interface. The storage device provides the host with a first request including device setting inquiry information, and sets a device configuration based on a first response to the device setting inquiry information received from the host. The host provides the storage device with the first response acquired from a user through the user interface in response to the first request. The device setting inquiry information includes at least one of information on allocation of a map buffer in the host memory, information on allocation of a write buffer in a buffer region of the storage device, or information on a power level of the storage device.

20 Claims, 18 Drawing Sheets

FIG. 5

| Logical Unit 1 | Logical Unit 2 |
|---|---|
| Logical Unit 3 | Logical Unit 4 |

FIG. 6

Buffer Region for WB

| WB – 16GB | LU1 | LU2 | LU3 | LU4 |
|---|---|---|---|---|
| Case 1 (Shared Buffer) | 16GB | | | |
| Case 2 (Dedicated Buffer) | 3GB | 5GB | 4GB | 4GB |
| Case 3 (Hybrid Buffer) | 8GB | | 4GB | 4GB |

| Feature | Setting 1 | Setting 2 | Device Performance Factors |
|---|---|---|---|
| Write Boost (WB) | On/Off | Buffer region allocation | Write performance, Available memory region |
| Host Performance Boost (HPB) | On/Off | Host memory allocation | Read performance, Host memory resource |
| Power Level of Storage Device | On/Off | Power level control | Read & Write performance, Power consumption |

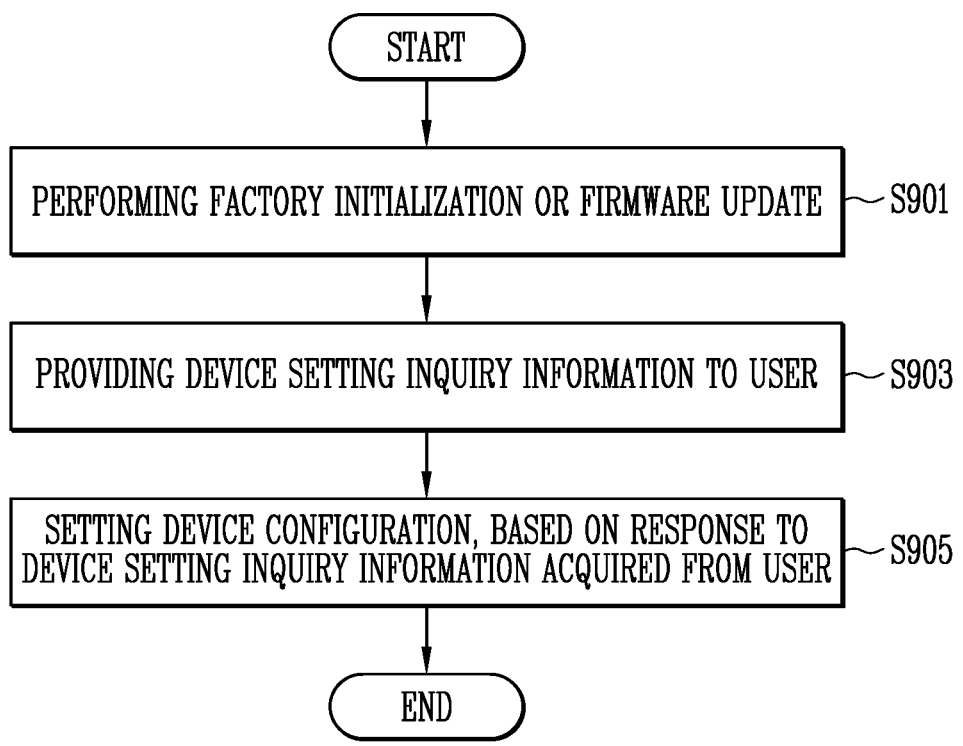

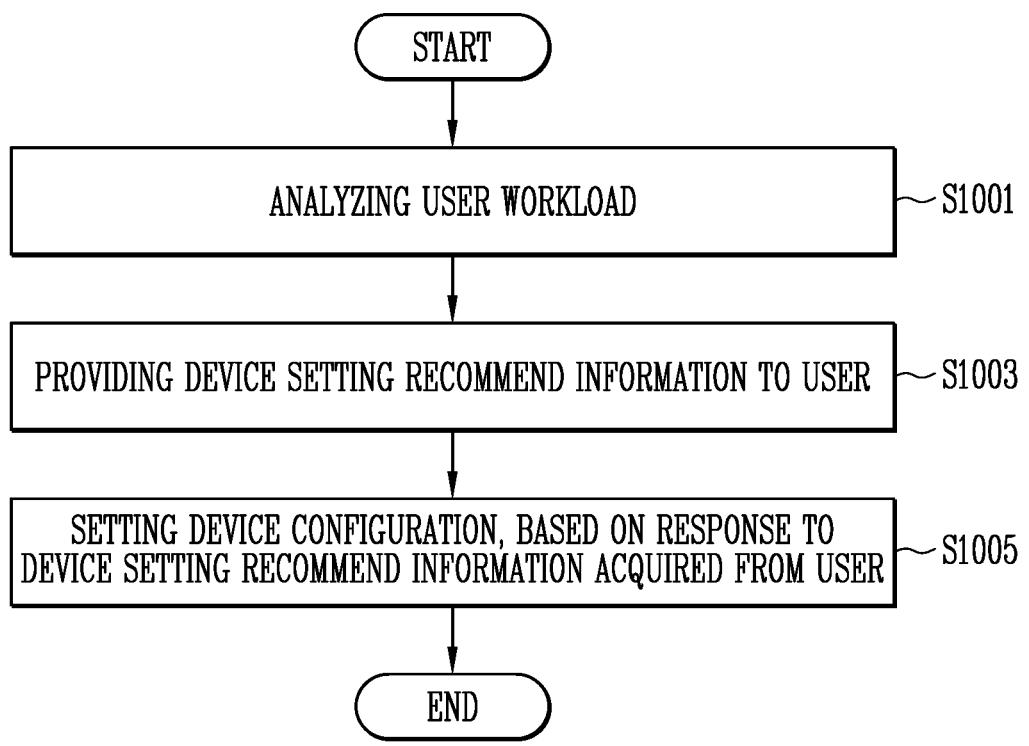

COMPUTING SYSTEM OF SETTING DEVICE CONFIGURATION AND OPERATING METHOD THEREOF

CROSS-REFERENCE TO RELATED APPLICATION

The present application claims priority under 35 U.S.C. § 119(a) to Korean patent application number 10-2021-0109027, filed on Aug. 18, 2021 with the Korean Intellectual Property Office, and which is incorporated herein by reference in its entirety.

BACKGROUND

Field of Invention

One or more embodiments described herein relate to a computing system and a method of operating a computing system.

Description of Related Art

A storage device includes a controller for controlling the storage of data in a memory device. Such a storage device is found in computers, smart phones and other types of host systems.

Memory device may be classified as volatile memory devices or nonvolatile memory devices. Volatile memory devices stores data only when power is supplied, e.g., the stored data is lost when the supply of power is turned off or otherwise interrupted. Examples of volatile memory devices include a Static Random Access Memory (SRAM) and a Dynamic Random Access Memory (DRAM).

Nonvolatile memory devices store data even when the supply of power is turned off or interrupted. Examples of nonvolatile memory devices include Read Only Memory (ROM), Programmable ROM (PROM), an Electrically Programmable ROM (EPROM), Electrically Erasable ROM (EEROM), and flash memory.

SUMMARY

Embodiments of the present disclosure provide a computing system for providing an optimized device configuration to users and an operating method of the computing system.

In accordance with an aspect of the present disclosure, there is provided a computing system including: a host including a host memory and a user interface; and a storage device configured to provide the host with a first request including device setting inquiry information, and set a device configuration, based on a first response to the device setting inquiry information, which is received from the host. The host is configured to provide the storage device with the first response acquired from a user through the user interface in response to the first request. The device setting inquiry information includes at least one of information on allocation of a map buffer in the host memory, information on allocation of a write buffer in a buffer region of the storage device, or information on a power level of the storage device.

In accordance with an aspect of the present disclosure, there is provided a method of operating a computing system including a host and a storage device, the method including: providing a user with a first request including device setting inquiry information through a user interface; and setting a device configuration based on a first response to the device setting inquiry information acquired from the user through the user interface. The device setting inquiry information includes at least one of information on allocation of a map buffer in a host memory, information on allocation of a write buffer in a buffer region of the storage device, or information on a power level of the storage device.

In accordance with an aspect of the present disclosure, there is provided a computing system including a host including a host memory and a user interface and a storage device including a controller and a memory device. The controller is configured to generate device setting information and provide the device setting information to the host. The host is configured to provide the device setting information through the user interface, acquire device setting response in response to the device setting information from the user through the user interface, and provide the device setting response to the controller. The controller is configured to receive the device setting response from the host, change firmware code based on the device setting response, and transmit a device setting command based on the changed firmware code such that the memory device changes device configuration based on the device setting command. The device configuration is associated with allocation of a buffer region of the memory device or a power level control of the memory device.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 5 illustrates an embodiment of memory device regions.
FIG. 6 illustrates an embodiment of an allocation of a write buffer.
FIG. 9 illustrates an embodiment of an operating method of a computing system.
FIG. 10 illustrates an embodiment of an operating method of a computing system.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Figure 1:
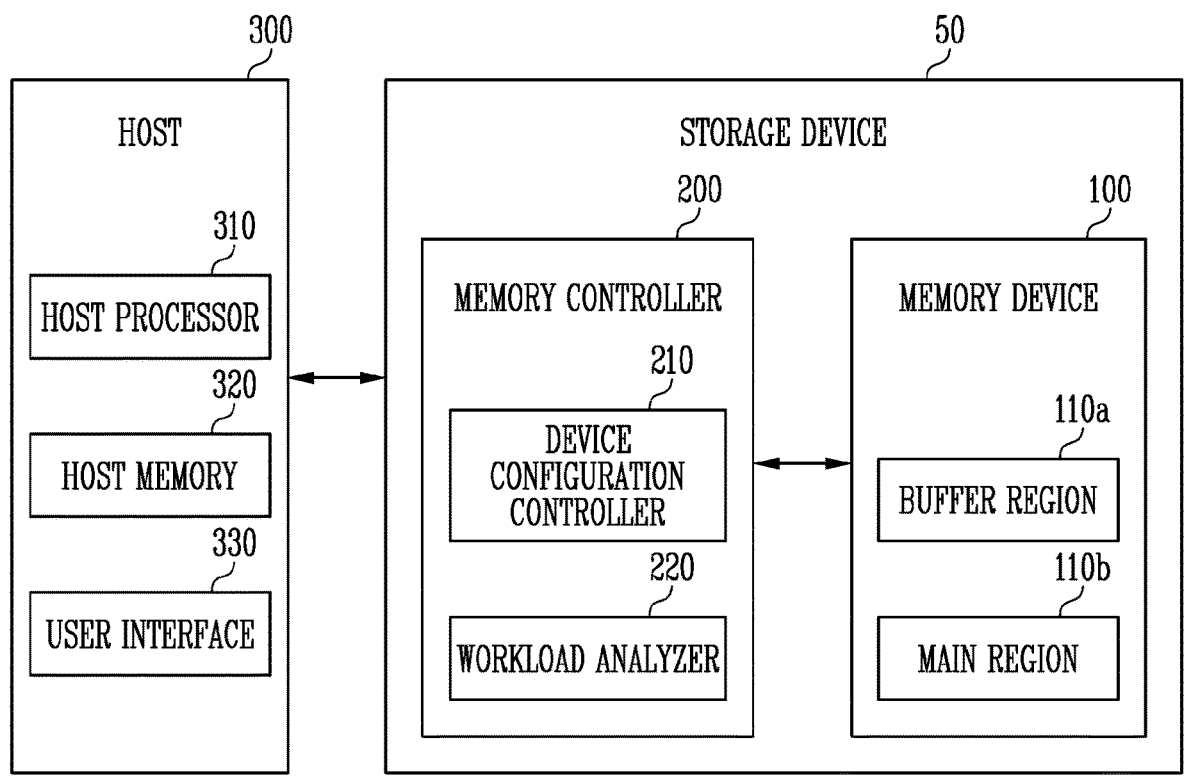
FIG. 1 illustrates an embodiment of a computing system.

FIG. 1 is a diagram illustrating an embodiment of a computing system 10 which may include a storage device 50 and a host 300.

The storage device 50 may include a memory device 100 and a memory controller 200 configured to control operation of the memory device 100. The storage device 50 may be a device for storing data under control of a host 300. Examples of the host 300 include a mobile phone, a smart phone, an MP3 player, a laptop computer, a desktop computer, a game console, a TV, a tablet PC or an in-vehicle infotainment.

Further, the storage device 50 may be manufactured as various types of storage devices according to a host interface that implements a communication scheme with the host 300. Examples of the storage device 50 include a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like. Also, the storage device 50 may be manufactured as various kinds of package types. Examples include a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 stores data under control of the memory controller 200. The memory device 100 may include a memory cell array including a plurality of memory cells for storing data. Each of the memory cells may be configured, for example, as a Single Level Cell (SLC) storing one data bit, a Multi-Level Cell (MLC) storing two data bits, a Triple Level Cell (TLC) storing three data bits, or a Quad Level Cell (QLC) storing four data bits.

The memory cell array may include a plurality of memory blocks, with each memory block including a plurality of memory cells. One memory block may include a plurality of pages. In an embodiment, a page may be a unit for storing data in the memory device 100 or reading data stored in the memory device 100. The memory block may be a unit for erasing data.

Examples of the memory device 100 include a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is assumed and described.

The memory device 100 receives a command and an address from the memory controller 200 and accesses a region selected by the address in the memory cell array, e.g., the memory device 100 may perform an operation instructed by the command on the region selected by the address. For example, the memory device 100 may perform a write (program) operation, a read operation, and an erase operation. In the program operation, the memory device 100 may program data in the region selected by the address. In the read operation, the memory device 100 may read data from the region selected by the address. In the erase operation, the memory device 100 may erase data stored in the region selected by the address.

In an embodiment, the memory device 100 may include a buffer region 110a and a main region 110b.

The buffer region 110a may include memory cells which store n (n is a natural number greater than or equal to 1) data bits. The main region 110b may include memory cells which store m (m is a natural number greater than or equal to n) data bits. Since a number of data bits stored by each memory cell in the buffer region 110a is less than or equal to the number of data bits stored by each memory cell in the main region 110b, the buffer region 110a may have a storage capacity less than that of the main region 110b but may be programmed or read faster than the main region 110b, and also may be more reliable than the main region 110a. Therefore, the buffer region 110a may be used as a write buffer which preferentially (or selectively) stores data to be stored in the main region 110b.

Also, the weight of the main region 110b may be lower than the weight of the buffer region 110a as the weight of the buffer region 110a in a total storage capacitor of the memory device 100 becomes higher.

The memory controller 200 may control overall operation of the storage device 50.

When power is applied to the storage device 50, the memory controller 200 may execute firmware (FW). When the memory device 100 is a flash memory device, the memory controller 200 may execute FW such as a Flash Translation Layer (FTL) for controlling communication between the host and the memory device 100.

In an embodiment, the memory controller 200 may receive data and a Logical Block Address (LBA) from the host 300, and translate the LBA to a Physical Block Address (PBA) representing addresses of memory cells included in the memory device 100, in which data is to be stored.

The memory controller 200 may control the memory device 100 to perform a program operation, a read operation, an erase operation, or the like in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a command, an address, and data regardless of any request from the host 300, and may transmit the command, the address, and the data to the memory device 100. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. The memory controller 200 may control the memory devices according to an interleaving scheme so as to improve operational performance. The interleaving scheme may be an operating scheme that allows operation periods of at least two memory devices 100 to overlap with each other.

In an embodiment, the memory controller 200 may include a device configuration controller 210 and a workload analyzer 220.

The device configuration controller 210 may generate a first request including device setting inquiry information. The device setting inquiry information may include at least one of information on allocation of a map buffer in a host memory 320, information on allocation of a write buffer in the buffer region 110a of the memory device 100 and information on a power level of the storage device 50. In an embodiment, the device configuration controller 210 may provide the first request to the host 300, when factory initialization or firmware update is performed.

The device configuration controller 210 may set a device configuration based on a first response to the device setting inquiry information received from the host 300. Based on the first response, the device configuration controller 210 may set at least one of whether the map buffer of the host memory 320 is to be used for a read operation or a size of the map buffer.

The device configuration controller 210 may provide the memory device 100 with a device setting command for setting the device configuration. The device setting command may change at least one of a size of the write buffer for a write operation or a power level of a regulator, e.g., a Low Drop Out (LDO) regulator, for supplying power to the memory device 100.

The device configuration controller 210 may provide the host 300 with a second request including device setting recommend information. The device configuration controller 210 may provide the second request to the host 300 when the device setting recommend information is generated during a runtime.

The device configuration controller 210 may change the device configuration based on a second response to the device setting recommend information received from the host 300. The device configuration controller 210 may provide the memory device 100 with a device setting command for changing the device configuration.

Based on the second response, the device configuration controller 210 may change the device configuration set based on the first response.

The workload analyzer 220 may analyze a workload pattern of a user. For example, the workload analyzer 220 may determine whether the workload pattern of the user is one in which a read operation is intensive, based on a result obtained by comparing a measured read performance with a reference performance. The workload analyzer 220 may determine whether the workload pattern is one in which a write operation is intensive, based on a result obtained by comparing a measured write performance with the reference performance. The workload analyzer 220 may determine whether the workload pattern is one having high power consumption based on a result obtained by comparing a measured battery capacity with a reference capacity.

The workload analyzer 220 may generate the device setting recommend information for changing the device configuration, based on a result obtained by analyzing the workload pattern of the user.

For example, the workload analyzer 220 may generate the device setting recommend information for changing at least one of whether the map buffer is to be used in the host memory 320 or the size of the map buffer based on a result obtained by comparing a read performance measured in the workload pattern with the reference performance. Also, the workload analyzer 220 may generate the device setting recommend information for changing at least one of whether the map buffer is to be used in the host memory 320 or the size of the map buffer, based on a result obtained by comparing an available capacity of the host memory 320 (e.g., measured in the workload pattern) with the reference capacity.

Additionally, the workload analyzer 220 may generate the device setting recommend information for changing at least one of whether the write buffer is to be used in the buffer region 110a or the size of the write buffer, based on a result obtained by comparing a write performance measured in the workload pattern with the reference performance. The workload analyzer 220 may generate the device setting recommend information for changing at least one of whether the write buffer is to be used in the buffer region 110a or the size of the write buffer, based on a result obtained by comparing an available capacity of the main region 110b (measured in the workload pattern) with the reference capacity.

Additionally, the workload analyzer 220 may generate the device setting recommend information for adjusting a power level of the memory device 100, based on a result obtained by comparing a battery capacity measured in the workload pattern with a reference battery capacity.

The host 300 may communicate with the storage device 50 using at least one of various forms of communication. Examples include a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

In an embodiment, the host 300 may include a host processor 310, the host memory 320, and a user interface 330.

The host processor 310 may control overall operation of the host 300, and for example may provide the storage device 50 with a first response acquired from the user through the user interface 330 in response to the first request received from the device configuration controller 210. The first response may be a response of the user to the device setting inquiry information.

The host processor 310 may provide the storage device 50 with a second response acquired from the user through the user interface 330 in response to the second request received from the device configuration controller 210. The second response may be a response of the user to the device setting recommend information.

The host memory 320 may be used as a map buffer for storing map data which, for example, may be used to improve the read performance of the storage device 50. The user interface 330 may be a communication interface for transmitting a request to the user or receiving a response to the request.

Figure 2:
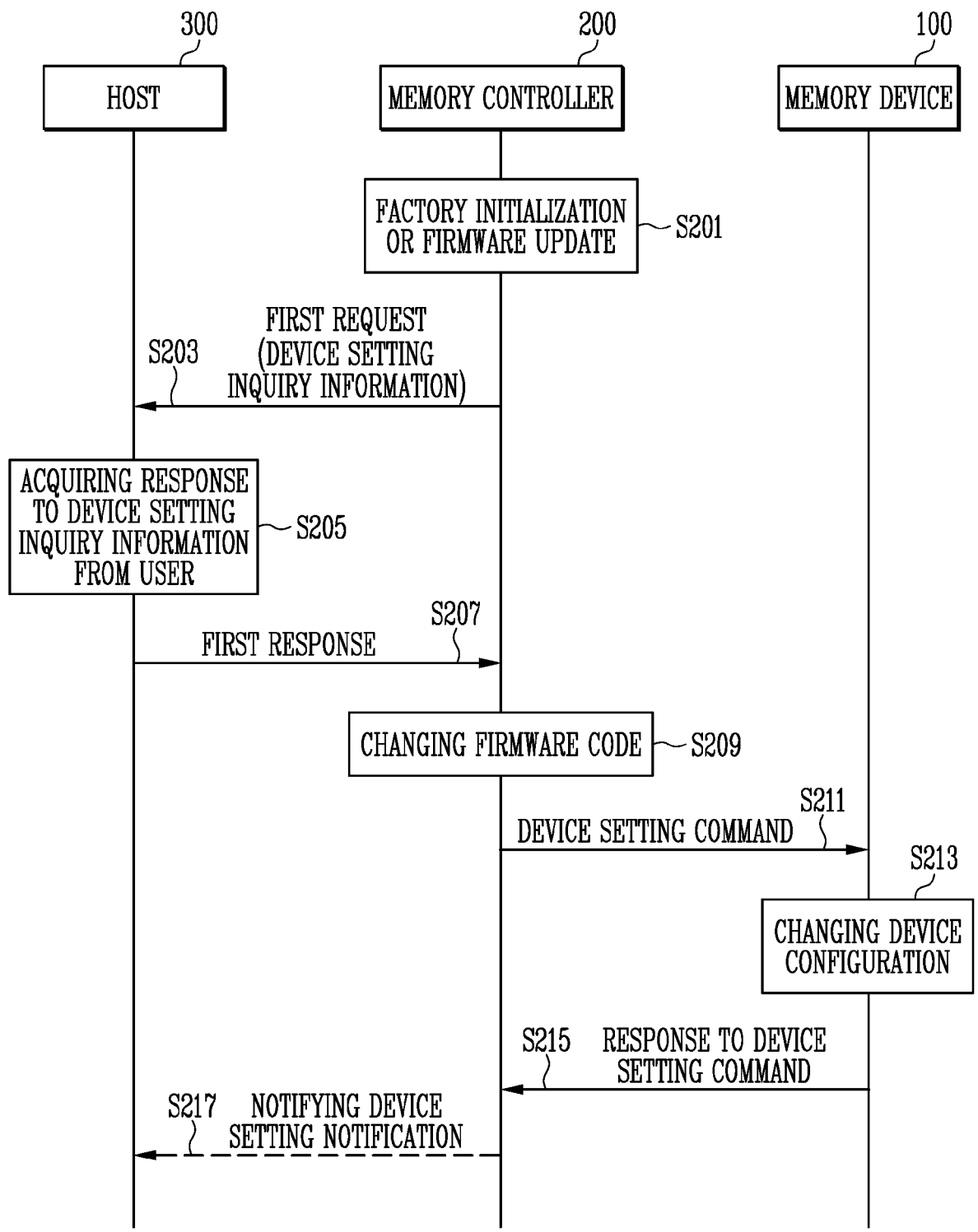
FIG. 2 illustrates an embodiment for operating the computing system.

FIG. 2 is a flowchart illustrating an embodiment of an operation method of the computing system.

Referring to FIG. 2, in operation S201, the memory controller 200 may perform factory initialization or firmware update.

In operation S203, the memory controller 200 may provide the host 300 with a first request including device setting inquiry information. The device setting inquiry information may include at least one of information on allocation of a map buffer in the host memory 320, information on allocation of a write buffer in the buffer region 110a of the storage device 50, or information on a power level of the storage device 50.

In operation S205, the host 300 may acquire a first response to the device setting inquiry information from a user through the user interface 330. For example, at a first step, the host 300 provides device setting inquiry to the user through the user interface (e.g., display messages). At a next step, the user inputs device setting values through the user interface. Finally, the host 300 acquires the device setting values inputted through the user interface and generates the first response.

In operation S207, the host 300 may provide the first response to the memory controller 200.

In operation S209, the memory controller 200 may change instructions (e.g., firmware code) associated with setting of a device configuration based on the first response.

In operation S211, the memory controller 200 may provide the memory device 100 with a device setting command for setting the device configuration.

In operation S213, the memory device 100 may set the device configuration in response to the device setting command.

In operation S215, the memory device 100 may provide the memory controller 200 with a response to the device setting command. The response to the device setting command may include information indicating whether the setting of the device configuration has been completed and a setting item.

In operation S217, the memory controller 200 may notify the host 300 of a device setting notification representing whether the device configuration has been normally set, based on the response to the device setting command.

Figure 3:
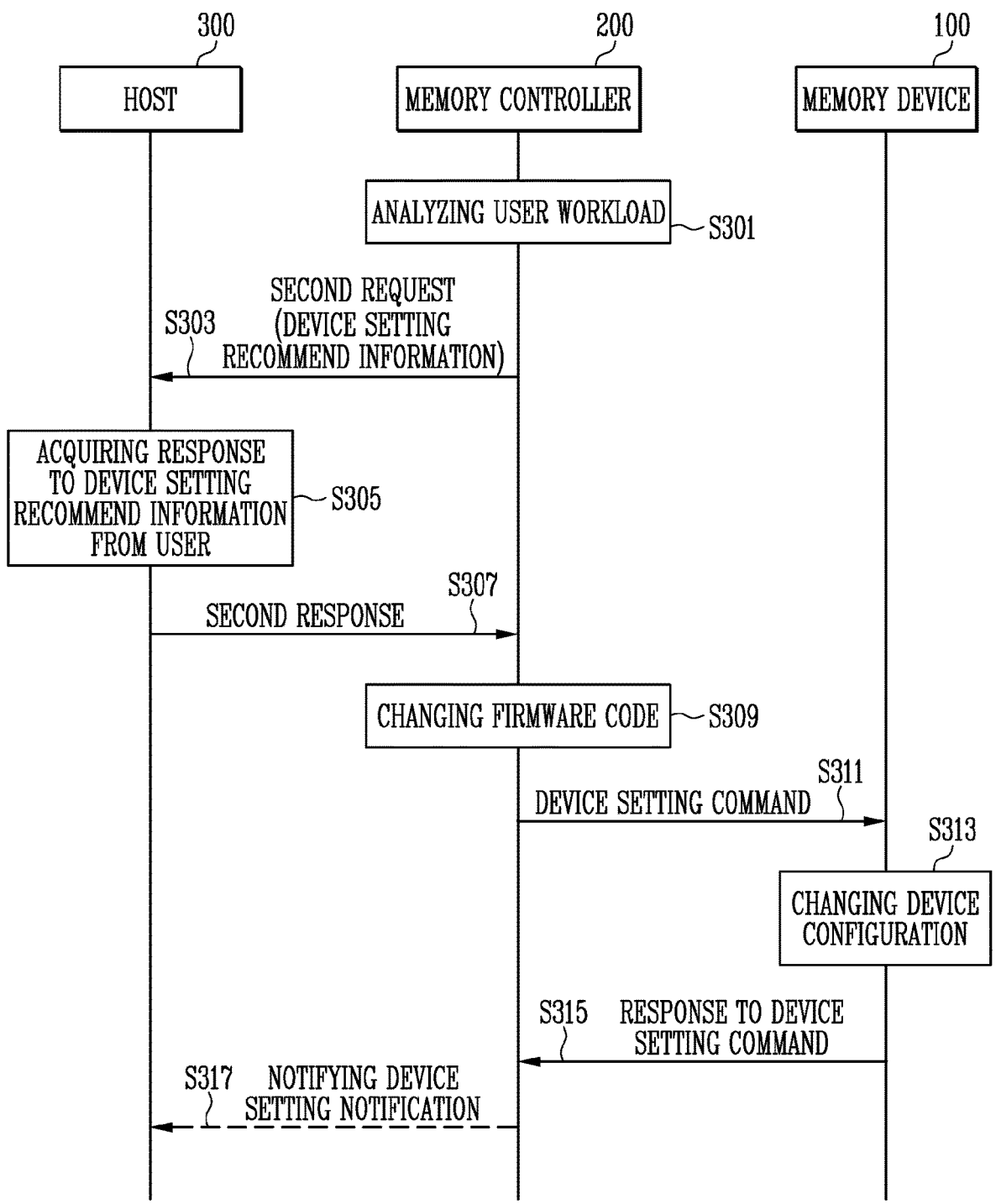
FIG. 3 illustrates an embodiment for operating the computing system.

FIG. 3 is a flowchart illustrating an embodiment of an operation method of the computing system.

Referring to FIG. 3, in operation S301, the memory controller 200 may analyze a workload of a user.

In operation S303, the memory controller 200 may provide the host 300 with a second request including device setting recommend information. The device setting recommend information may include information for recommending changing of a device configuration indicated in the device setting inquiry information.

In operation S305, the host 300 may acquire a second response to the device setting recommend information from a user through the user interface 330.

In operation S307, the host 300 may provide the second response to the memory controller 200.

In operation S309, the memory controller 200 may change instructions (e.g., firmware code) associated with setting of the device configuration, based on the second response.

In operation S311, the memory controller 200 may provide the memory device 100 with a device setting command for changing the device configuration.

In operation S313, the memory device 100 may change the device configuration in response to the device setting command.

In operation S315, the memory device 100 may provide the memory controller 200 with a response to the device setting command. The response to the device setting command may include information indicating whether the changing of the device configuration has been completed and a changing item.

In operation S317, the memory controller 200 may notify the host 300 of a device setting notification representing whether the device configuration has been normally changed, based on the response to the device setting command.

Figure 4:
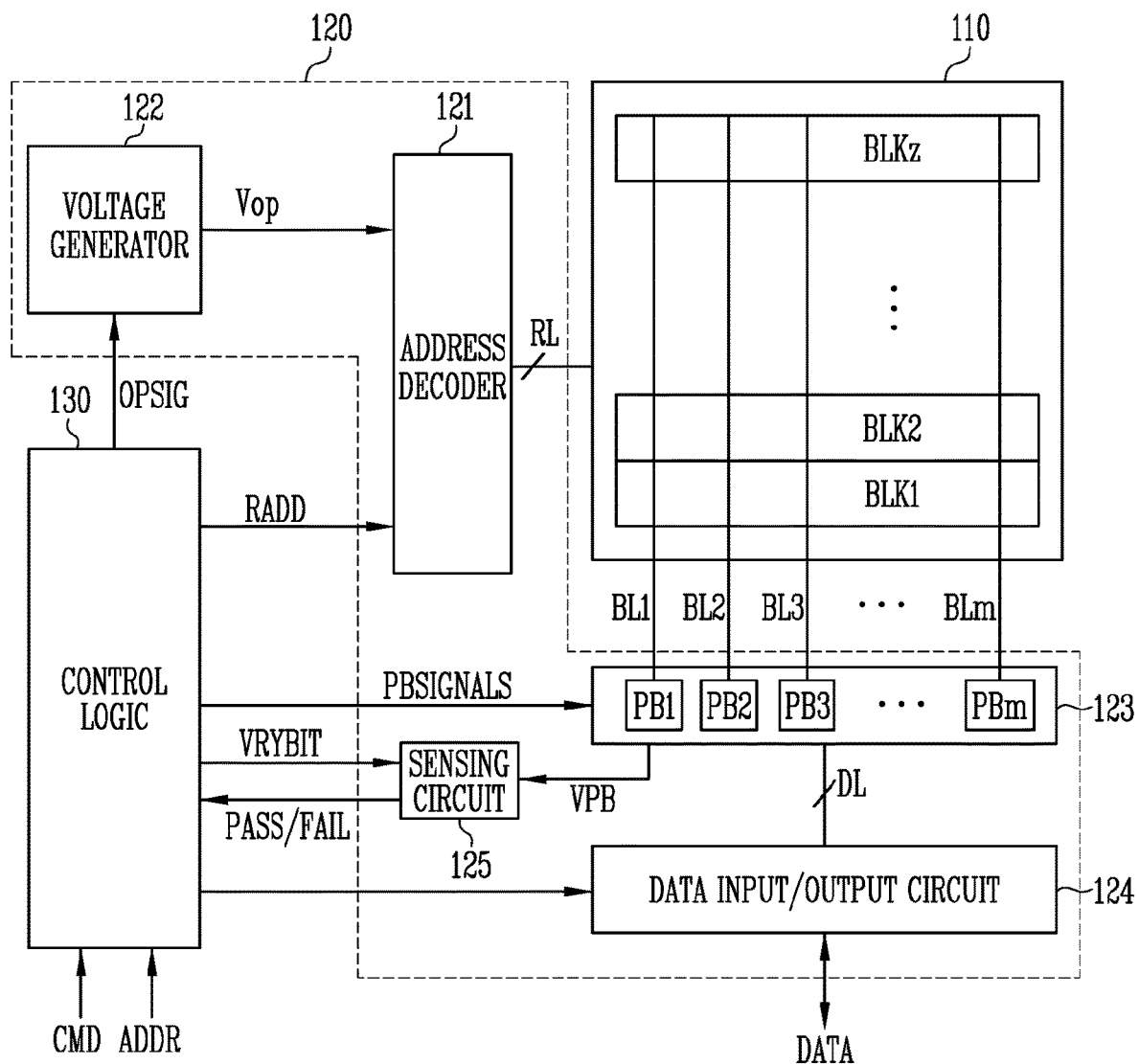
FIG. 4 illustrates an embodiment of a memory device.

FIG. 4 is a diagram illustrating an embodiment of the memory device 100 shown in FIG. 1.

Referring to FIG. 4, the memory device 100 may include a memory cell array 100, a peripheral circuit 120, and a control logic 130.

The memory cell array 110 includes a plurality of memory blocks BLK1 to BLKz, each of which are connected to an address decoder 121 through row lines RL. The memory blocks BLK1 to BLKz are connected to a read/write circuit 123 through bit lines BL1 to BLm and include a plurality of memory cells.

In an embodiment, the memory cells may be nonvolatile memory cells. Memory cells connected to the same word line may be defined as one physical page. Thus, the memory cell array 110 may be configured with a plurality of physical pages. In accordance with an embodiment of the present disclosure, each of the memory blocks BLK1 to BLKz in the memory cell array 110 may include a plurality of dummy cells. One or more dummy cells may be connected in series between a drain select transistor and memory cells and between a source select transistor and the memory cells.

The memory cells of the memory device 100 may be configured, for example, as a Single Level Cell (SLC) storing one data bit, a Multi-Level Cell (MLC) storing two data bits, a Triple Level Cell (TLC) storing three data bits, or a Quad Level Cell (QLC) storing four data bits.

The peripheral circuit 120 may include the address decoder 121, a voltage generator 122, the read/write circuit 123, a data input/output circuit 124, and a sensing circuit 125.

The peripheral circuit 120 drives the memory cell array 110, e.g., the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. In accordance with an embodiment, the word lines may include normal word lines and dummy word lines. In accordance with an embodiment, the row lines RL may further include a pipe select line.

The address decoder 121 may operate under the control of the control logic 130 and may receive an address ADDR from the control logic 130.

The address decoder 121 may decode a block address in the received address ADDR and may select at least one memory block among the memory blocks BLK1 to BLKz according to the decoded block address. In addition, the address decoder 121 may decode a row address in the received address ADDR and may select at least one word line among word lines of a memory block selected according to the decoded row address. The address decoder 121 may apply an operating voltage Vop supplied from the voltage generator 122 to the selected word line.

In a program operation, the address decoder 121 may apply a program voltage to the selected word line and may apply a pass voltage (e.g., having a level lower than that of the program voltage) to unselected word lines. In a program verify operation, the address decoder 121 may apply a verify voltage to the selected word line and may apply a verify pass voltage (e.g., having a level higher than that of the verify voltage) to the unselected word lines.

In a read operation, the address decoder 121 may apply a read voltage to the selected word line and may apply a read pass voltage (e.g., having a level higher than that of the read voltage) to the unselected word lines.

In accordance with an embodiment of the present disclosure, an erase operation of the memory device 100 is performed in units of memory blocks. In an erase operation, the address ADDR input to the memory device 100 includes a block address. The address decoder 121 may decode the block address and select at least one memory block according to the decoded block address. In the erase operation, the address decoder 121 may apply a ground voltage to word lines connected to the selected memory block.

In accordance with an embodiment of the present disclosure, the address decoder 121 may decode a column address in the address ADDR transmitted thereto. The decoded column address may be transmitted to the read/write circuit 123. In an example, the address decoder 121 may include components such as a row decoder, a column decoder, and an address buffer.

The voltage generator 122 may generate a plurality of operating voltages Vop using an external power voltage supplied to the memory device 100. The voltage generator 122 may operates under control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of operating voltages Vop using the external power voltage or the internal power voltage. The voltage generator 122 may generate various voltages for the memory device 100. For example, the voltage generator 122 may generate a plurality of erase voltages, a plurality of program voltages, a plurality of pass voltages, a plurality of select read voltages, and a plurality of unselect read voltages.

In order to generate a plurality of operating voltages Vop having various voltage levels, the voltage generator 122 may include a plurality of pumping capacitors for receiving the internal power voltage and may generate the plurality of operating voltages Vop by selectively activating the pumping capacitors under control of the control logic 130. The generated operating voltages Vop may be supplied to the memory cell array 110 by the address decoder 121.

In an embodiment, the voltage generator 122 may generate a plurality of operating voltages Vop, to be used for a memory operation, based on a target pump clock. The voltage generator 122 may generate the target pump clock in response to a clock control signal and may generate the operating voltages Vop based on the target pump clock. The operating voltages Vop may include at least one of a program voltage, an erase voltage, a pass voltage, a verify voltage, a read voltage, or a negative voltage.

The read/write circuit 123 includes first to mth page buffers PB1 to PBm connected to the memory cell array 110 through the respective first to mth bit lines BL1 to BLm. The first to mth page buffers PB1 to PBm operate under control of the control logic 130.

The first to mth page buffers PB1 to PBm communicate data DATA with the data input/output circuit 124. In a program operation, the first to mth page buffers PB1 to PBm receive data DATA to be stored through the data input/output circuit 124 and data lines DL.

In a program operation, the first to mth page buffers PB1 to PBm may transfer data DATA (received through the data input/output circuit 124) to selected memory cells through bit lines BL1 to BLm when a program pulse is applied to a selected word line. The selected memory cells are programmed according to the transferred data DATA. A memory cell connected to a bit line through which a program allow voltage (e.g., a ground voltage) is applied may have an increased threshold voltage. A threshold voltage of a memory cell connected to a bit line through which a program inhibit voltage (e.g., a power voltage) is applied may be maintained. In a program verify operation, the first to mth page buffers PB1 to PBm read data DATA stored in the selected memory cells from the selected memory cells through the bit lines BL1 to BLm.

In a read operation, the read/write circuit 123 may read data DATA from memory cells of a selected page through the bit lines BL and may store the read data DATA in the first to mth page buffers PB1 to PBm.

In an erase operation, the read/write circuit 123 may float the bit lines BL. In an embodiment, the read/write circuit 123 may include a column select circuit.

The data input/output circuit 124 is connected to the first to mth page buffers PB1 to PBm through the data lines DL. The data input/output circuit 124 operates under control of the control logic 130. In one embodiment, the data input/output circuit 124 may include a plurality of input/output buffers that receive input data DATA. In a program operation, the data input/output circuit 124 may receive data DATA to be stored from an external controller. In a read operation, the data input/output circuit 124 outputs, to the external controller, data transmitted from the first to mth page buffers PB1 to PBm included in the read/write circuit 123.

In a read operation or verify operation, the sensing circuit 125 may generate a reference current in response to an allow bit VRYBIT signal generated by the control logic 130, and may output a pass signal or fail signal to the control logic 130 by comparing a sensing voltage VPB received from the read/write circuit 123 and a reference voltage generated by the reference current.

The control logic 130 may be connected to the address decoder 121, the voltage generator 122, the read/write circuit 123, the data input/output circuit 124, and the sensing circuit 125. The control logic 130 may control overall operation of the memory device 100. The control logic 130 may operate in response to a command CMD transferred from an external device.

Additionally, the control logic 130 may control the peripheral circuit 120 by generating several signals in response to a command CMD and an address ADDR. For example, the control logic 130 may generate an operation signal OPSIG, a row address RADD, a read/write circuit control signal PBSIGNALS, and an allow bit VRYBIT in response to the command CMD and the address ADDR. The control logic 130 may output the operation signal OPSIG to the voltage generator 122, output the row address RADD to the address decoder 121, output the read/write circuit control signal PBSIGNALS to the read/write circuit 123, and output the allow bit VRYBIT to the sensing circuit 125. Also, the control logic 130 may determine whether the verify operation has passed or failed in response to the pass or fail signal PASS/FAIL output by the sensing circuit 125.

A main region in a storage region of the memory device 100 may be divided into a plurality of logical regions, e.g., the host 300 described with reference to FIG. 1 may allocate a main region of the storage device 50 to a plurality of logical regions.

FIG. 5 is a diagram illustrating an embodiment of a logical region of the memory device.

In FIG. 5, the main region may be divided in first to fourth logical regions (or units). The number of logical regions obtained by dividing the main region is not limited to this embodiment. Data stored in the main region may be divided for each logical region to be managed.

FIG. 6 is a diagram illustrating an example allocation of a write buffer in the buffer region of the memory device.

Referring to FIG. 6, since the number of data bits stored by a memory cell in the buffer region is less than the number of data bits stored by the memory cell in the main region, the buffer region may have a storage capacity less than that of the main region, but may be accessed faster than the main region. Therefore, the buffer region may be used as a write buffer WB.

For example, when data is stored in the storage device, the data may be preferentially (or selectively) stored in the write buffer in the buffer region. Subsequently, the data stored in the write buffer may be migrated (or transferred) to the main region. In such a manner, write performance of the storage device can be improved.

The main region of the storage device is shown as being divided into four logical regions LU1 to LU4. In another embodiment, the write buffer may be allocated with a different number of logical regions.

Also, in one embodiment, the size of the write buffer may be 16 GB, but the writer buffer may have a different size in another embodiment.

Referring to FIG. 6, in Case 1, 16 GB of the write buffer may be shared by the logical regions LU1 to LU4. The 16 GB of the write buffer is not dedicated in a specific logical area, but may be freely used in each logical region.

In Case 2, 16 GB of the write buffer may be divided by and thus dedicated to respective ones of logical regions LU1 to LU4. For example, among 16 GB of the write buffer: 3 GB may be dedicated when data is stored in a first logical region LU1, 5 GB may be dedicated when data is stored in a second logical region LU2, 4 GB may be dedicated when data is stored in a third logical region LU3, and 4 GB may be dedicated when data is stored in a fourth logical region LU4.

Case 3 may represent a combination of Case 1 and Case 2. For example, among the 16 GB of the write buffer: 8 GB may be shared by the first and second logical regions LU1 and LU2, 4 GB may be dedicated when data is stored in the third logical region LU3, and 4 GB may be dedicated when data is stored in the fourth logical region LU4.

In FIG. 6, the write buffer in the buffer region of the storage device may be allocated to logical regions in various ways, by dividing the main region so as to improve write performance.

Figures 7, 8A:
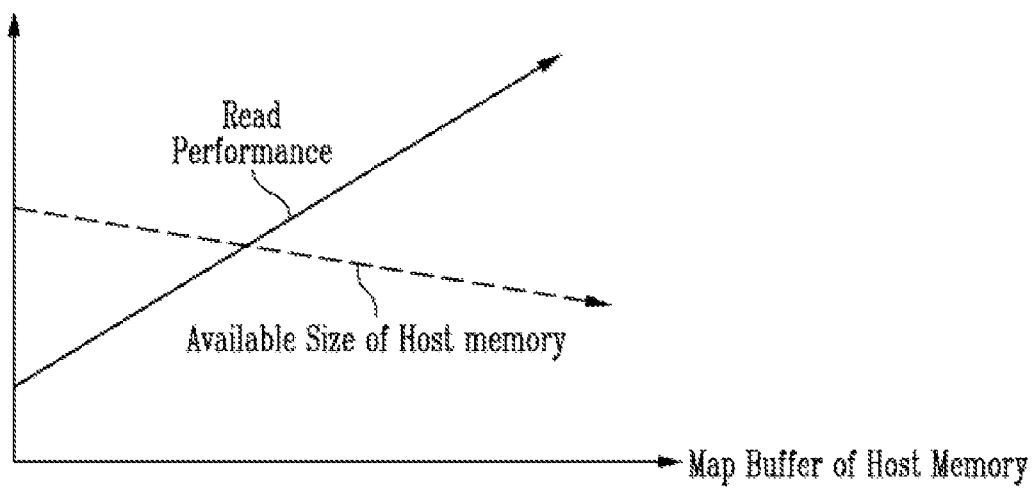
FIG. 7 illustrates an example of device setting inquiry information on a device configuration.
FIG. 8A illustrates an example of a relationship between a map buffer of a host memory and read performance of a storage device.

FIG. 7 is a diagram illustrating an example of device setting inquiry information on a device configuration.

Referring to FIG. 7, the device setting inquiry information may include at least one of information on a write boost (WB), information on a host performance boost (HPB), or information on a power level of the storage device.

The write boost may be a device configuration associated with write performance and the size of an available memory region. The information on the write boost may include information on whether a write buffer in the buffer region of the storage device is to be used and information on the size of the write buffer.

The host performance boost may be a device configuration associated with read performance and a resource of the host memory. The information on the host performance boost may include information on whether a map buffer in the host memory is to be used and information on the size of the map buffer.

The power level of the storage device may be a device configuration associated with read and write performance and power consumption. The information on the power level of the storage device may include information on whether a power level of a regulator, e.g., a Low Drop Out (LDO) regulator, for supplying power to the storage device has been changed and a size of the power level.

FIG. 8A is a diagram illustrating an example of a relationship between the map buffer of the host memory and read performance of the storage device in the device configuration.

Referring to FIG. 8A, the available size of the host memory may decrease as the size of a map buffer in the host memory increases. The read performance of the storage device may be improved as the size of the map buffer increases. In other words, as a capacity allocated for the map buffer among a total capacity of the host memory increases, a capacity allocated for other operations decreases.

Figure 8B:
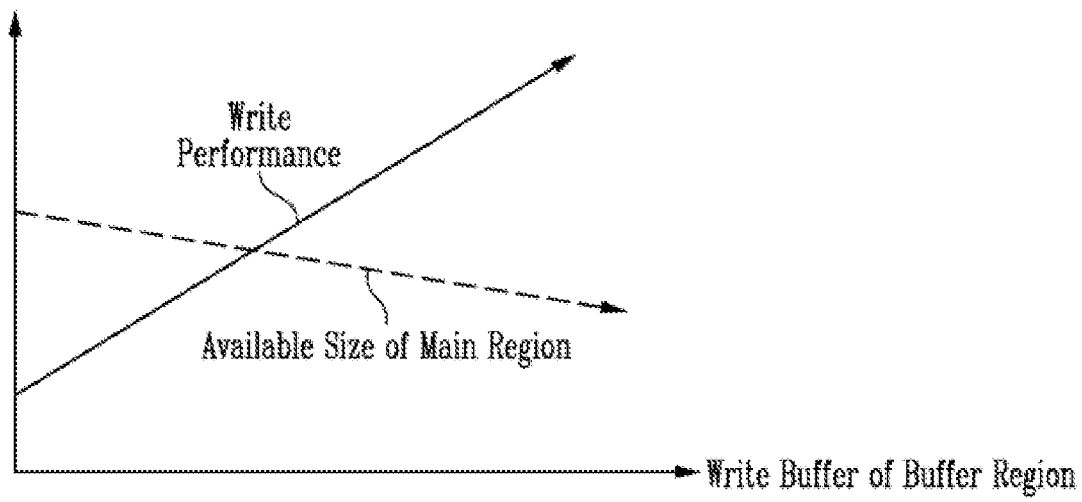
FIG. 8B illustrates an example of a relationship between the write buffer of the buffer region and write performance of the storage device.

FIG. 8B is a diagram illustrating an example of a relationship between the write buffer of the buffer region and write performance of the storage device in the device configuration.

Referring to FIG. 8B, the available size of the main region may decrease as the size of the write buffer in the buffer region of the storage device increases. This is because the size of the main region decreases as the size of the buffer region in a total capacity of the storage device increases. The write performance of the storage device may be improved as the size of the write buffer increases.

Figure 8C:
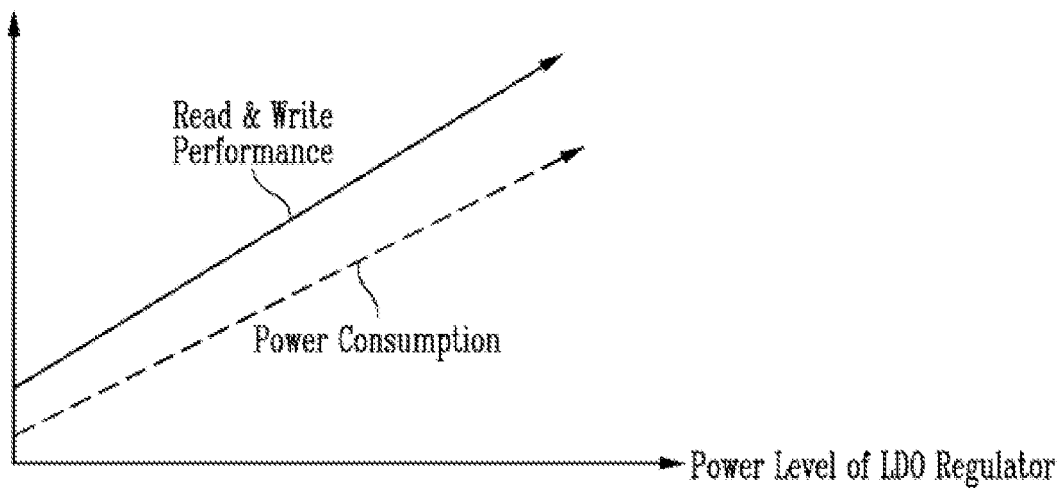
FIG. 8C illustrates an example of a relationship between a power level of an LDO regulator and read and write performance of the storage device.

FIG. 8C is a diagram illustrating an example of a relationship between a power level of a regulator (e.g., the LDO regulator) and read and write performance of the storage device in the device configuration.

Referring to FIG. 8C, as the size of the power level of the LDO regulator for supplying power to the storage device increases, power consumption may increase and battery capacity may decrease. The entire performance of the storage device, including reading and writing, may be improved as the size of the power level of the storage device increases.

FIG. 9 is a flowchart illustrating an embodiment of an operating method of the computing system, which, for example, may include the host and the storage device.

Referring to FIG. 9, in operation S901, the computing system may perform factory initialization or firmware update.

In operation S903, the computing system may provide device setting inquiry information to a user through the user interface. The device setting inquiry information may include at least one of information on allocation of a map buffer of the host memory, information on allocation of a write buffer in the buffer region of the storage device, or information on a power level of the storage device.

In operation S905, the computing system may set a device configuration based on a response to the device setting inquiry information acquired from the user through the user interface.

FIG. 10 is a flowchart illustrating an embodiment of an operating method of the computing system.

Referring to FIG. 10, in operation S1001, the computing system may analyze a user workload.

For example, the computing system may determine whether a workload pattern of a user is a workload pattern in which a read operation is intensive based on a result obtained by comparing a measured read performance with a reference performance. The computing system may determine whether the workload pattern is one in which a write operation is intensive based on a result obtained by comparing a measured write performance with the reference performance. The computing system may determine whether the workload pattern is one having high power consumption based on a result obtained by comparing a measured battery capacity with a reference capacity.

In operation S1003, the computing system may generate device setting recommend information for changing a device configuration based on a result obtained by analyzing the user workload, and may provide the device setting recommend information to the user through the user interface.

The device setting recommend information may include at least one of information on whether a write buffer is to be used in the buffer region of the storage device, information on setting of a size of the write buffer, or information on allocation of the write buffer. The device setting recommend information may include at least one of information on whether a map buffer is to be used in the host memory or information on setting of a size of the map buffer. The device setting recommend information may include information on whether a power level of a regulator, e.g., the Low Drop Out (LDO) regulator, for supplying power to the storage device has been set and a size of the power level.

In operation S1005, the computing system may set the device configuration based on a response to the device setting recommend information acquired from the user through the user interface.

Figure 11:
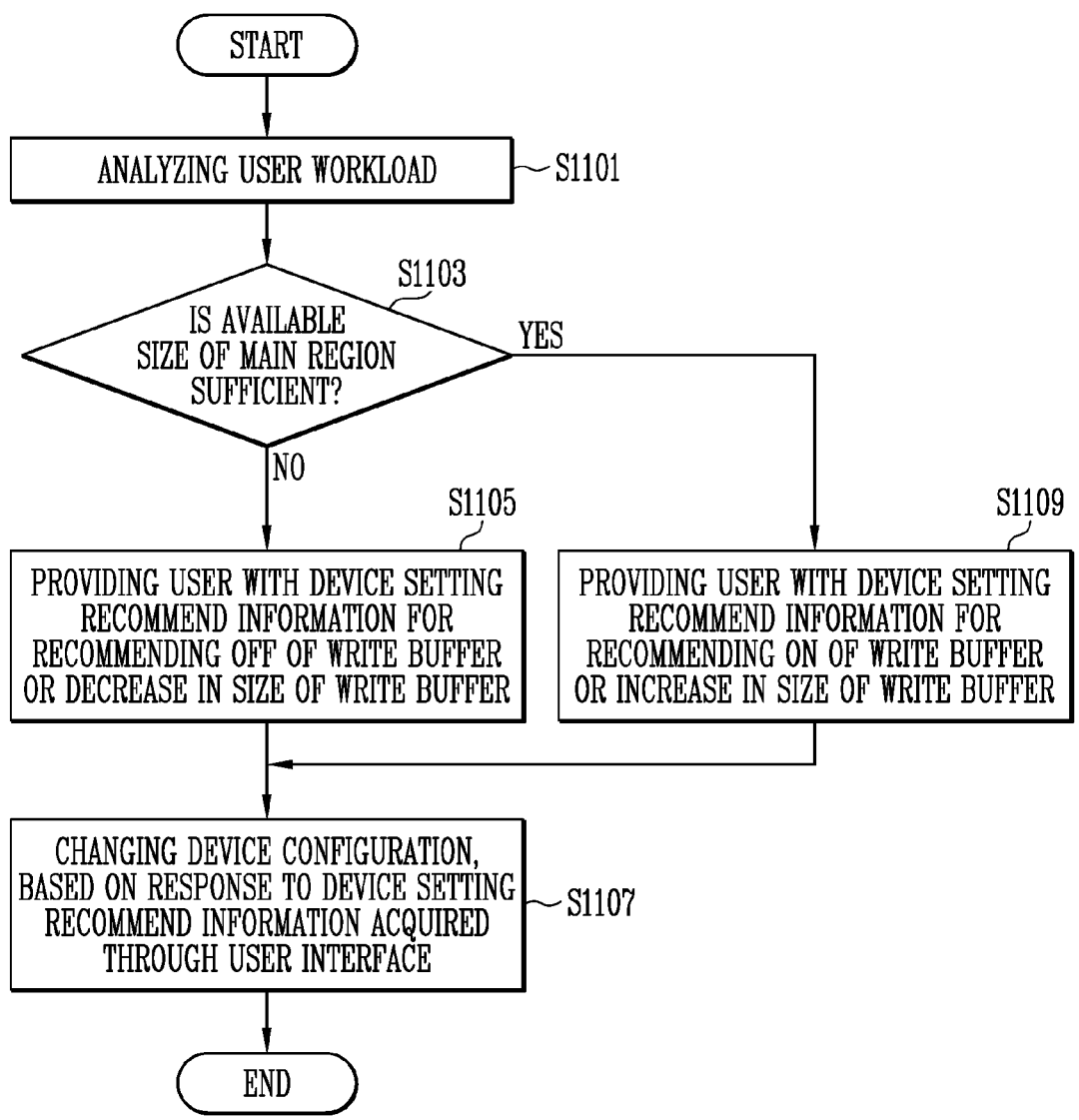
FIG. 11 illustrates an embodiment of an operating method of a computing system.

FIG. 11 is a flowchart illustrating an embodiment of an operating method of the computing system, for example, which may be in accordance with the embodiment shown in FIG. 10.

Referring to FIG. 11, in operation S1101, the computing system may analyze a user workload.

In operation S1103, the computing system may determine whether an available size of the main region of the storage device is sufficient as compared with a reference size. When the available size is sufficient as a determination result, e.g., the available size of the main region of the storage device is greater than the reference size, the computing system proceeds to operation S1109. When the available size is not sufficient as a determination result, e.g., the available size of the main region of the storage device is less than or equal to the reference size, the computing system may proceed to operation S1105.

In operation S1105, the computing system may provide a user with device setting recommend information for recommending off of the write buffer or a decrease in size of the write buffer through the user interface.

The storage device may include the main region and the buffer region. Since the available size of the main region in the total storage capacity of the storage is insufficient, the storage device may decrease the size of the buffer region and increase the size of the main region. Since the size of the buffer region is decreased, the use of the write buffer in the buffer region may be limited. For example, the write buffer may not be used or the size of the write buffer may be decreased.

In operation S1107, the computing system may set (change) a device configuration based on a response to the device setting recommend information acquired from the user through the user interface.

In operation S1109, the computing system may provide the user with device setting recommend information for recommending one of the write buffer or an increase in size of the write buffer through the user interface.

Since the available size of the main region in the total storage capacity of the storage device is sufficient, the storage device may increase the size of the buffer region and decrease the size of the main region. Since the size of the buffer region is increased, use of the write buffer in the buffer region may be increased. For example, after the write buffer was previously in a state in which the write buffer was not used, the write buffer may be used. Therefore, when the write buffer is in a state in which the write buffer is used, the size of the write buffer may be increased.

Figure 12:
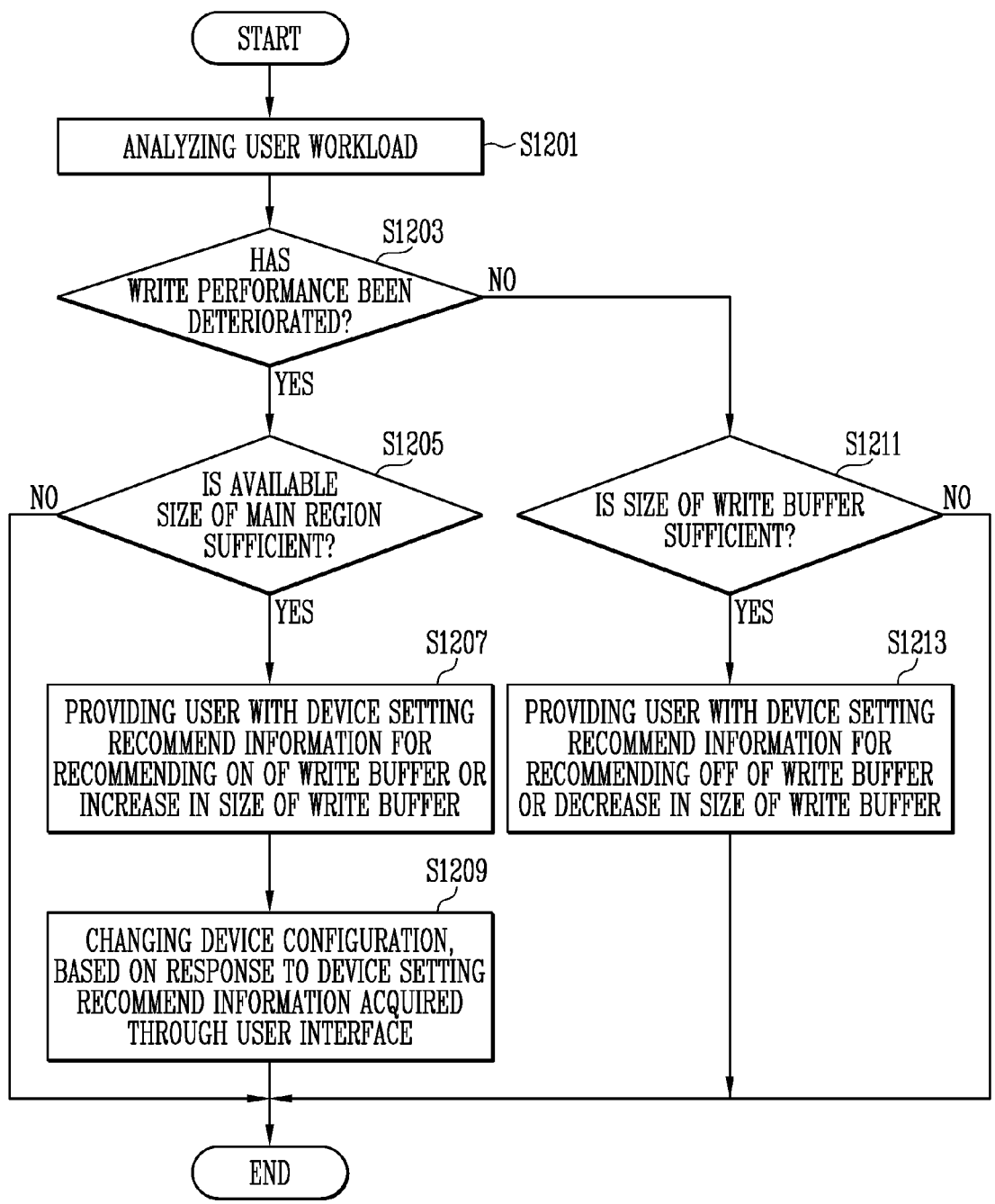
FIG. 12 illustrates an embodiment of an operating method of a computing system.

FIG. 12 is a flowchart illustrating an embodiment of an operating method of the computing system, which, for example, may be in accordance with the embodiment shown in FIG. 10.

Referring to FIG. 12, in operation S1201, the computing system may analyze a user workload.

In operation S1203, the computing system may determine whether a measured write performance has been deteriorated by comparing the write performance with a reference performance. When the write performance is deteriorated as a determination result, e.g., the measured write performance is less than the reference performance, the computing system proceeds to operation S1205. When the write performance is not deteriorated as a determination result, the computing system may proceed to operation S1211.

In operation S1205, the computing system may determine whether an available size of the main region of the storage device is sufficient as compared with a reference size. When the available size of the main region is sufficient as a determination result, e.g., the available size of the main region is greater than the reference size, the computing system may proceed to operation S1207. When the available size of the main region is not sufficient as a determination result, the computing system may end this operation.

In operation S1207, the computing system may provide a user with device setting recommend information for recommending on of the write buffer or an increase in size of the write buffer through the user interface.

In operation S1209, the computing system may set (change) a device configuration based on a response to the device setting recommend information acquired from the user through the user interface.

In operation S1211, the computing system may determine whether the size of the write buffer is sufficient based on a result obtained by comparing the size of the write buffer with a threshold size. When the size of the write buffer is sufficient (e.g., when the size of the write buffer is greater than the threshold size) as a determination result, the computing system may proceed to operation 1213. When the size of the write buffer is not sufficient (e.g., when the size of the write buffer is less than or equal to the threshold size) as a determination result, the computing system may end this operation.

In operation S1213, the computing system may provide the user with device setting recommend information for recommending off of the write buffer or a decrease in size of the write buffer through the user interface.

Figure 13:
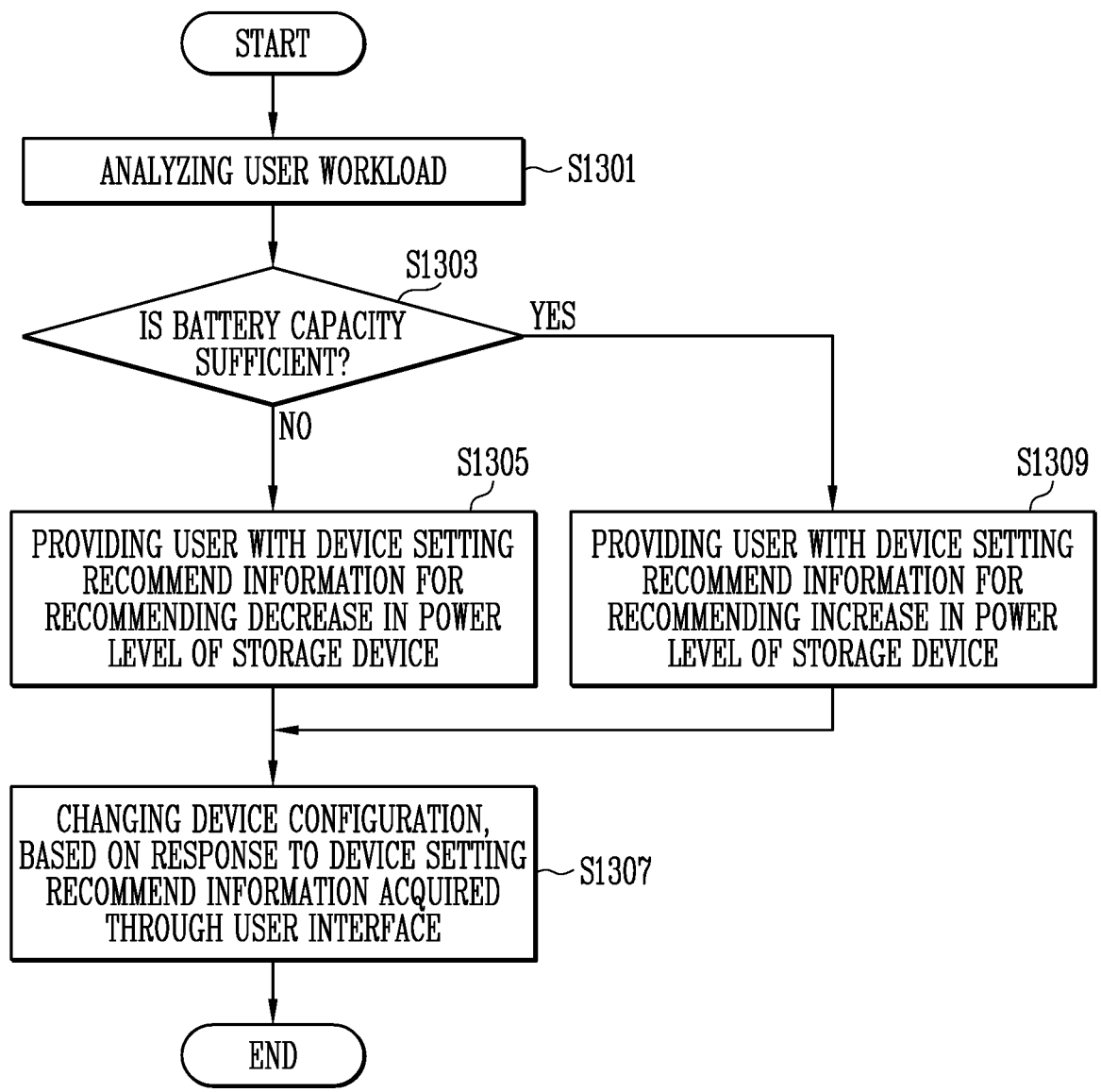
FIG. 13 illustrates an embodiment of an operating method of a computing system.

FIG. 13 is a flowchart illustrating an embodiment of an operating method of a computing system, which, for example, may be in accordance with the embodiment shown in FIG. 10.

Referring to FIG. 13, in operation S1301, the computing system may analyze a user workload.

In operation S1303, the computing system may determine whether a measured battery capacity is sufficient based on a result obtained by comparing the battery capacity with a reference battery capacity. When the battery capacity is sufficient as a determination result, e.g., the battery capacity is greater than the reference battery capacity, the computing system may proceed to operation S1309. When the battery capacity is not sufficient as a determination result, the computing system may proceed to operation S1305.

In operation S1305, the computing system may provide a user with device setting recommend information for recommending a decrease in power level of the storage device through the user interface. For example, the device setting recommend information may be information for recommending a decrease in power level of a regulator, e.g., the Low Drop Out (LDO) regulator, for supplying power to the storage device. The computing system can slow the rate of depletion of the battery capacity through the decrease in power level of the LDO regulator.

In operation S1307, the computing system may set (change) a device configuration based on a response to the device setting recommend information acquired from the user through the user interface.

In operation S1309, the computing system may provide the user with device setting recommend information for recommending an increase in power level of the storage device through the user interface. For example, the device setting recommend information may be information for recommending an increase in power level of the LDO regulator for supplying power to the storage device. The computing system can improve the entire performance of the storage device through the increase in power level of the LDO regulator.

Figure 14:
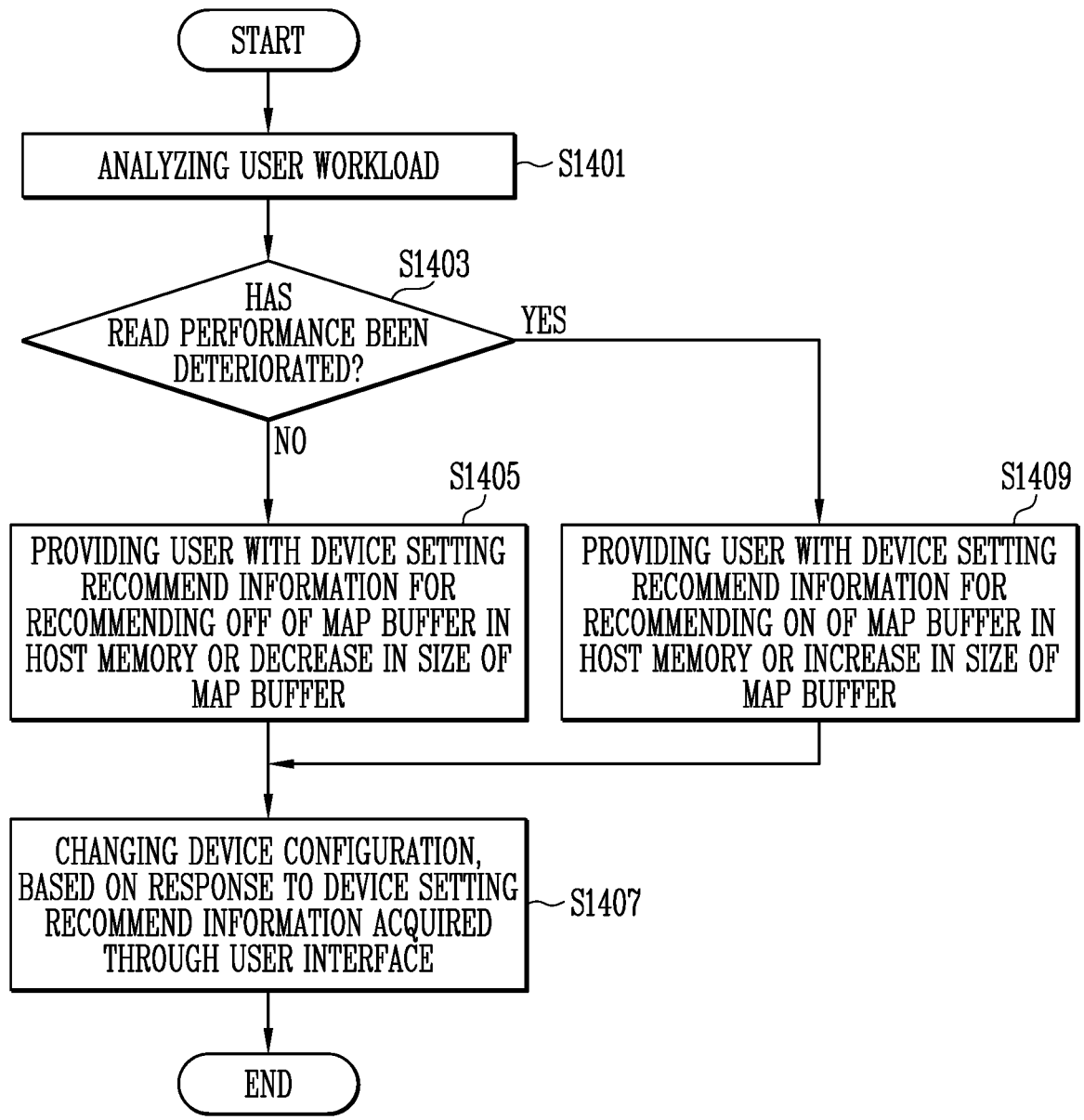
FIG. 14 illustrates an embodiment of an operating method of a computing system.

FIG. 14 is a flowchart illustrating an embodiment of an operating method of the computing system, which for example, may be in accordance with the embodiment shown in FIG. 10.

Referring to FIG. 14, in operation S1401, the computing system may analyze a user workload.

In operation S1403, the computing system may determine whether a measured read performance has been deteriorated by comparing the read performance with a reference performance. When the read performance is deteriorated as a determination result, e.g., the read performance is less than the reference performance, the computing system may proceed to operation S1409. When the read performance is not deteriorated as a determination result, the computing system may proceed to operation S1405.

In operation S1405, the computing system may provide a user with device setting recommend information for recommending off of the map buffer in the host memory or a decrease in size of the map buffer through the user interface.

In one embodiment, a Host Performance Boost (HPB) may be a method of using a host memory region as a region in which map data is stored so as to improve read performance. When the read performance is not deteriorated, the computing system may not use the map buffer for storing map data in the host memory, or may secure a resource of the host memory by decreasing the size of the map buffer.

In operation S1407, the computing system may set (change) a device configuration based on a response to the device setting recommend information acquired from the user through the user interface.

In operation S1409, the computing system may provide the user with device setting recommend information for recommending on of the map buffer in the host memory or an increase in size of the map buffer through the user interface.

When the read performance is deteriorated, the computing system may use the map buffer for storing map data in the host memory, or may improve the deteriorated read performance by increasing the size of the map buffer.

Figure 15:
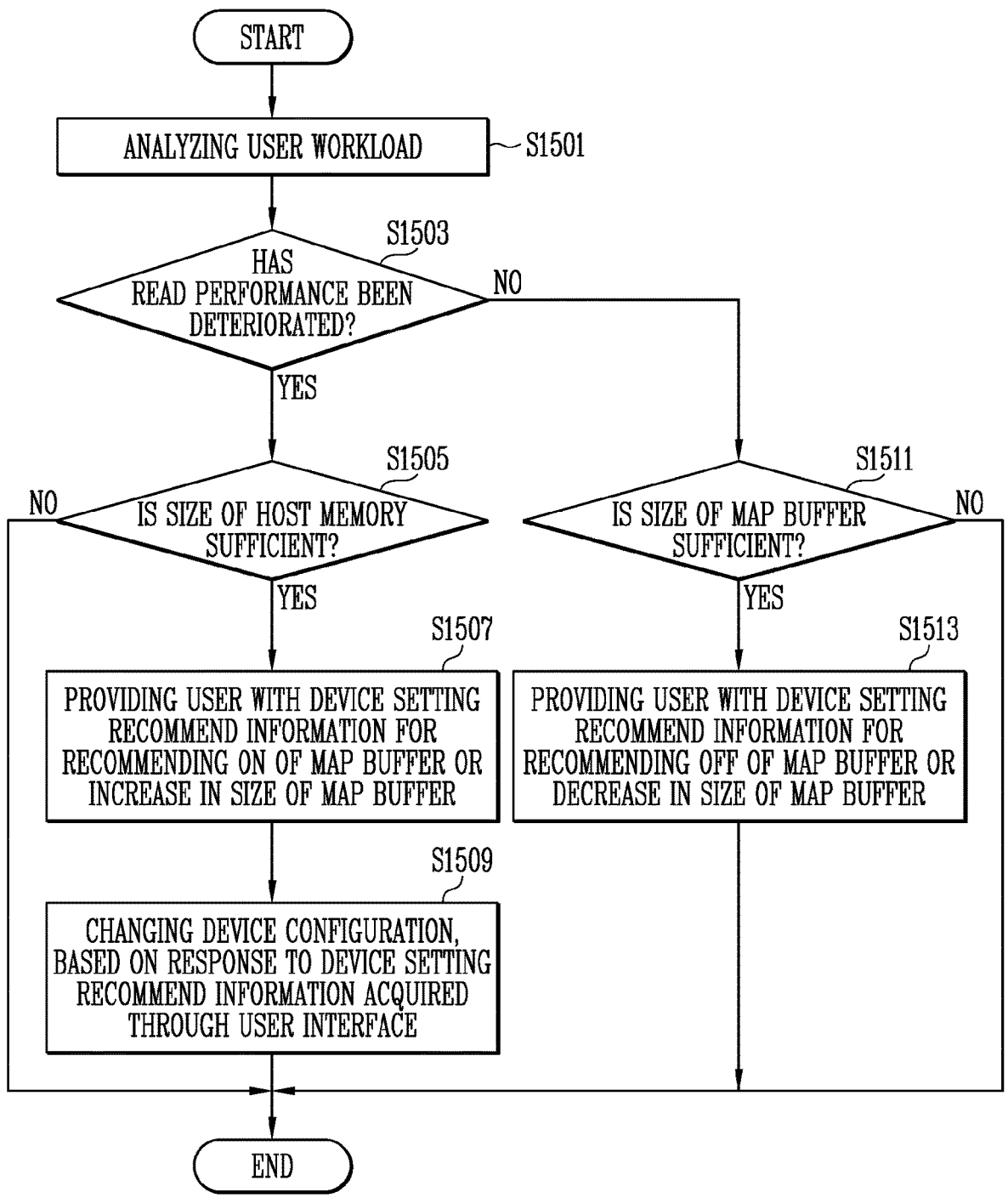
FIG. 15 illustrates an embodiment of an operating method of a computing system.

FIG. 15 is a flowchart illustrating an embodiment of an operating method of the computing system, which, for example, may be in accordance with the embodiment shown in FIG. 10.

Referring to FIG. 15, in operation S1501, the computing system may analyze a user workload.

In operation S1503, the computing system may determine whether a measured read performance has been deteriorated by comparing the read performance with a reference performance. When the read performance is not deteriorated as a determination result, e.g., the read performance is greater than the reference performance, the computing system may proceed to operation S1511. When the read performance is deteriorated as a determination result, the computing system may proceed to operation S1505.

In operation S1505, the computing system may determine whether an available capacity of the host memory is sufficient as compare with a reference size. When the available capacity of the host memory is sufficient as a determination result, e.g., the available capacity of the host memory is greater than the reference size, the computing system may proceed to operation S1507. When the available capacity of the host memory is not sufficient as a determination result, the computing system may end this operation. In one embodiment, the reference size for determining whether the available capacity of the host memory is sufficient may be different from that for determining whether the available size of the main region is sufficient.

In operation S1507, the computing system may provide a user with device setting recommend information for recommending on of the map buffer or an increase in size of the map buffer through the user interface.

In operation S1509, the computing system may set (change) a device configuration based on a response to the device setting recommend information acquired from the user through the user interface.

In operation S1511, the computing system may determine whether the size of the map buffer is sufficient based on a result obtained by comparing the size of the map buffer with a threshold size. When the size of the map buffer is sufficient (e.g., when the size of the map buffer is greater than the threshold size) as a determination result, the computing system may proceed to operation S1513. When the size of the map buffer is not sufficient (e.g., when the size of the map buffer is less than or equal to the threshold size) as a determination result, the computing system may end this operation. In one embodiment, the threshold size that serves as a reference for determining whether the size of the map buffer is sufficient may be different from that which serves a reference for determining whether the size of the write buffer is sufficient.

In operation S1513, the computing system may provide the user with device setting recommend information for recommending off of the map buffer or a decrease in size of the map buffer through the user interface.

Figure 16:
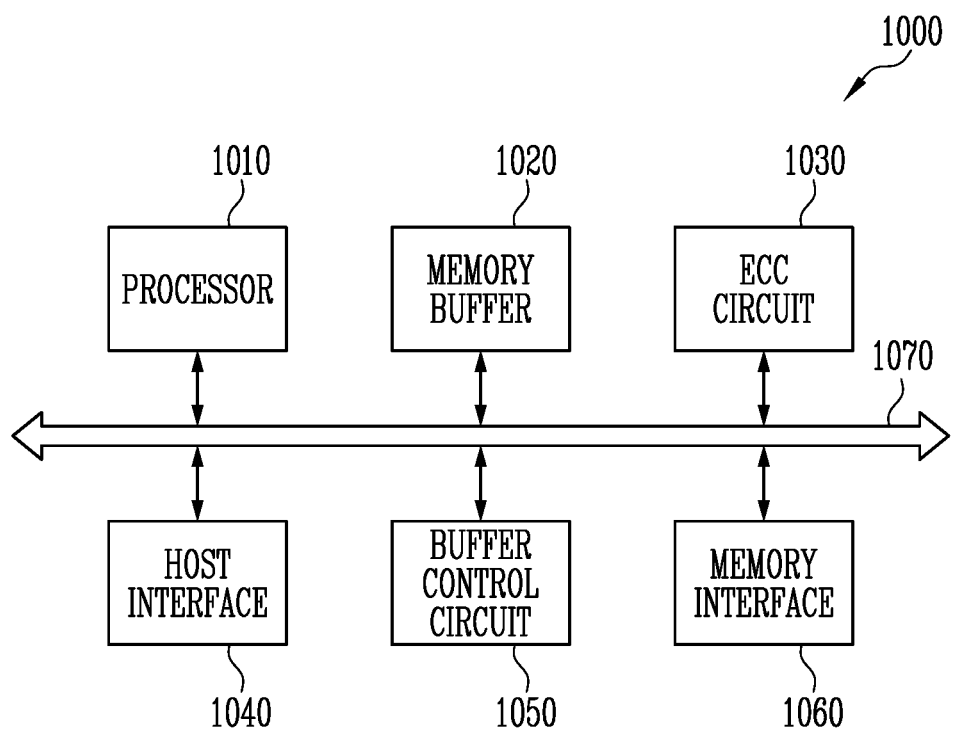
FIG. 16 illustrates an embodiment of a memory controller.

FIG. 16 is a diagram illustrating an embodiment of a memory controller 1000, which, for example, may correspond to the memory controller shown in FIG. 1.

Referring to FIG. 16, the memory controller 1000 is connected to a host and a memory device and may access the memory device in response to a request received from the host. For example, the memory controller 1000 may control write, read, erase, and background operations of the memory device. The memory controller 1000 may provide an interface between the memory device and the host and may drive instructions (e.g., firmware) for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000 and may perform logical operations. The processor 1010 may communicate with the external host through the host interface 1040 and may communicate with the memory device through the memory interface 1060. Also, the processor 1010 may communicate with the memory buffer 1020 through the buffer control circuit 1050. The processor 1010 may control an operation of the storage device using the memory buffer 1020 as a working memory, a cache memory or a buffer memory.

The processor 1010 may perform a function of a flash translation layer (FTL). For example, the processor 1010 may translate a logical block address (LBA) provided by the host through the FTL into a physical block address (PBA). The FTL may receive an LBA, using a mapping table, to translate the LBA into a PBA. Several address mapping methods of the FTL exist according to mapping units. A representative address mapping method includes a page mapping method, a block mapping method, and a hybrid mapping method.

The processor 1010 may randomize data received from the host, e.g., processor 1010 may randomize data received from the host using a randomizing seed. The randomized data is provided as data to be stored to the memory device to be programmed in the memory cell array.

In a read operation, the processor 1010 may derandomize data received from the memory device, e.g., the processor 1010 may derandomize data received from the memory device using a derandomizing seed. The derandomized data may be output to the host.

In an embodiment, the processor 1010 may perform randomizing and derandomizing by driving software or firmware.

The memory buffer 1020 may be used as the working memory, the cache memory, or the buffer memory of the processor 1010. The memory buffer 1020 may store codes and commands executed by the processor 1010. The memory buffer 1020 may include a Static RAM (SRAM) or a Dynamic RAM (DRAM).

The ECC circuit 1030 may perform an ECC operation, e.g., the ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010 using at least one of various communication methods. Examples include a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a NonVolatile Memory Express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

In an example, the memory controller 1000 may not include the memory buffer 1020 and the buffer control circuit 1050.

In an example, the processor 1010 may control operation of the memory controller 1000 using codes. The processor 1010 may load codes from a nonvolatile memory device (e.g., a read only memory (ROM)) provided in the memory controller 1000 In another example, the processor 1010 may load codes from the memory device through the memory interface 1060.

In an example, the bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other and may not interfere or influence with each other. The data bus may be connected to the host interface 1040, the buffer control circuit 1050, the ECC circuit 1030, and the memory interface 1060. The control bus may be connected to the host interface 1040, the processor 1010, the buffer control circuit 1050, the memory buffer 1020, and the memory interface 1060.

Figure 17:
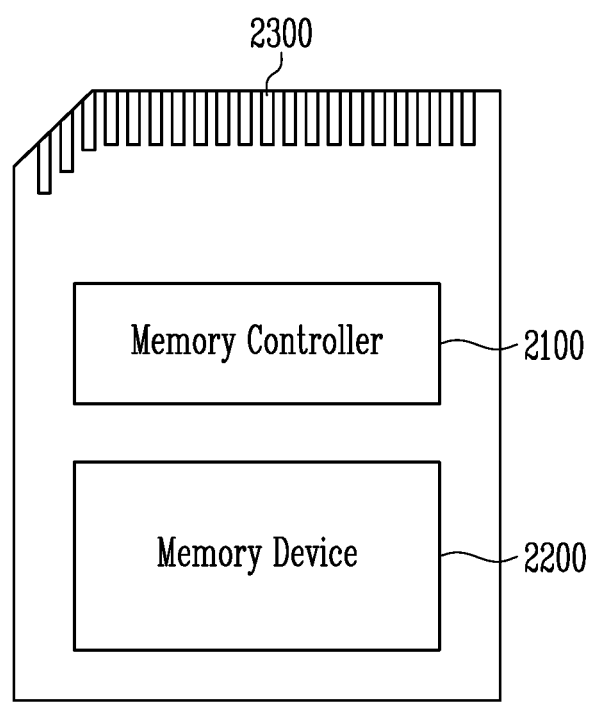
FIG. 17 illustrates an embodiment of a memory card system.

FIG. 17 is a block diagram illustrating an embodiment of a memory card system 2000 to which the storage device may be applied.

Referring to FIG. 17, the memory card system 2000 includes a memory controller 2100, a memory device 2200, and a connector 2300.

The memory controller 2100 is connected to and thus configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to drive instructions (e.g., firmware) for controlling the memory device 2200. The memory controller 2100 may be implemented in the same or different manner as the memory controller 200 described with reference to FIG. 1.

In one example, the memory controller 2100 may include components such as a Random Access Memory (RAM), a processing unit, a host interface, a memory interface, and the error corrector.

The memory controller 2100 may communicate with an external device through the connector 2300, e.g., the memory controller 2100 may communicate with the external device (e.g., the host) according to a specific communication protocol. Example communication protocols include a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

Exemplarily, the memory device 2200 may be implemented with various types of nonvolatile memory devices. Examples include an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Transfer Torque magnetic RAM (STT-MRAM).

The memory controller 2100 and the memory device 2200 may be integrated into a single semiconductor device to constitute a memory card. Examples include a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 18:
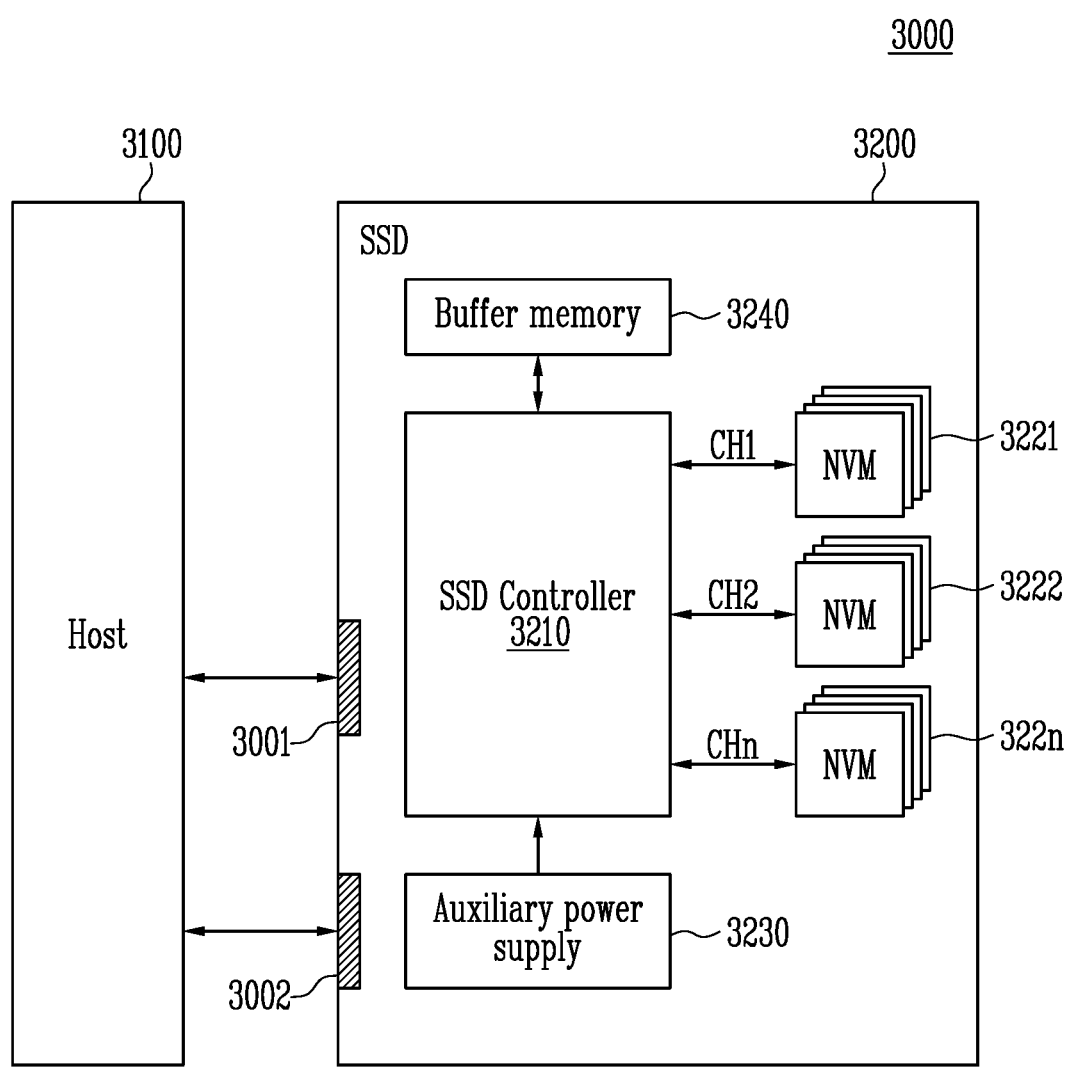
FIG. 18 illustrates an embodiment of a Solid State Drive.

FIG. 18 is a block diagram illustrating an embodiment of a Solid State Drive (SDD) system 3000 to which the storage device may be applied.

Referring to FIG. 18, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power supply 3230, and a buffer memory 3240.

In accordance with an embodiment of the present disclosure, the SSD controller 3210 may serve as the memory controller 200 described with reference to FIG. 1.

The SSD controller 3210 may control the flash memories 3221 to 322n in response to a signal SIG received from the host 3100. For example, the signal SIG may be one based on an interface between the host 3100 and the SSD 3200. For example, the signal SIG may be one defined by at least one of interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is connected to the host 3100 through the power connector 3002. When the supply of power from the host 3100 is not smooth (e.g., deviates from a predetermined level or pattern), the auxiliary power supply 3230 may provide power of the SSD 3200. For example, the auxiliary power supply 3230 may be located in the SSD 3200 or outside of the SSD 3200. For example, the auxiliary power supply 3230 may be located on a main board and may provide auxiliary power to the SSD 3200.

The buffer memory 3240 operates as a buffer memory of the SSD 3200. For example, the buffer memory 3240 may temporarily store data received from the host 3100 or data received from the flash memories 3221 to 322n, or may temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 19:
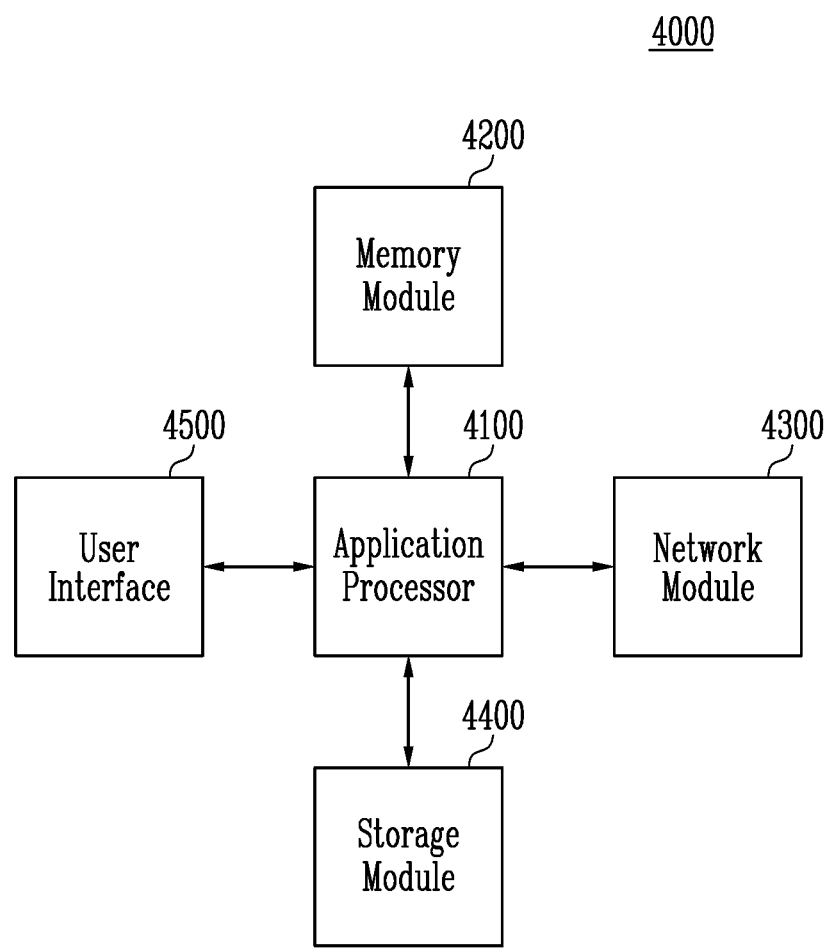
FIG. 19 illustrates an embodiment of a user system.

FIG. 19 is a block diagram illustrating an embodiment of a user system 4000 to which the storage device may be applied.

Referring to FIG. 19, the user system 4000 includes an application processor 4100, a memory module 4200, a network module 4300, a storage module 4400, and a user interface 4500.

The application processor 4100 may drive components included in the user system 4000, an operating system (OS), a user program, or the like. For example, the application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. Examples of the memory module 4200 include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. Exemplarily, the application processor 4100 and the memory module 4200 may be provided as one semiconductor package by being packaged based on a Package on Package (PoP).

The network module 4300 may communicate with external devices, e.g., the network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), WiMAX, WLAN, UWB, Bluetooth, and Wi-Fi. In one embodiment, the network module 4300 may be included in the application processor 4100.

The storage module 4400 may store data received from the application processor 4100. In one embodiment, the storage module 4400 may transmit data stored therein to the application processor 4100. In one embodiment, the storage module 4400 may be implemented with a nonvolatile semiconductor memory device. Examples include a Phase-change RAM (PRAM), a Magnetic RAM (MRAM), a Resistive RAM (RRAM), a NAND flash, a NOR flash, or a NAND flash having a three-dimensional structure. In one embodiment, the storage module 4400 may be provided as a removable drive such as a memory card of the user system 4000 or an external drive.

In one embodiment, the storage module 4400 may include a plurality of nonvolatile memory devices that operate the same as or different from the memory device 100 described with reference to FIG. 1. The storage module 4400 may operate identically to the storage device 50 described with reference to FIG. 1.

The user interface 4500 may include interfaces for inputting data or commands to the application processor 4100 and/or outputting data to an external device. Examples of user input interfaces include as a keyboard, a keypad, a button, a touch panel, a touch screen, a touch pad, a touch ball, a camera, a microphone, a gyroscope sensor, a vibration sensor and a piezoelectric element. Examples of user output interfaces include a Liquid Crystal Display (LCD), an Organic Light Emitting Diode (OLED) display device, an Active Matrix OLED (AMOLED) display device, an LED, a speaker, and a monitor.

In accordance with one or more embodiments, a computing system and method are provided with an optimized device configuration to users.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

What is claimed is:

1. A storage device comprising:
a memory device including a buffer region and a main region; and
a memory controller configured to provide a host with a first request including device setting inquiry information, to receive a first response, that is acquired by the host from a user through a user interface of the host in response to the first request, from the host, and to set a device configuration based on the first response to the device setting inquiry information,
wherein the device setting inquiry information includes at least one of information on allocation of a map buffer in a host memory of the host, information on allocation of a write buffer in the buffer region of the storage device, or information on a power level of the storage device.

2. The storage device of claim 1, wherein the memory controller provides the first request to the host when factory initialization or a firmware update is performed.

3. The storage device of claim 1, wherein the memory controller is further configured to:
generate device setting recommend information to change the device configuration based on a result obtained by analyzing a workload pattern of the user, and
provide the host with a second request including the device setting recommend information.

4. The storage device of claim 3, wherein the memory controller receives a second response to the device setting recommend information from the host,
wherein the second response is acquired by the host from the user through the user interface in response to the second request.

5. The storage device of claim 4, wherein
the memory controller sets the device configuration based on the first response or the second response.

6. The storage device of claim 5, wherein the memory controller includes:
a device configuration controller configured to provide a device setting command to the memory device in response to the first response or the second response; and
a workload analyzer configured to generate the device setting recommend information based on the result obtained by analyzing the workload pattern.

7. The storage device of claim 6, wherein the device configuration controller sets at least one of whether the map buffer for a read operation is to be used or a size of the map buffer, based on the first response or the second response.

8. The storage device of claim 6, wherein the device configuration controller provides the memory device with the device setting command to change at least one of a size of the write buffer for a write operation or a power level of a regulator for supplying power to the storage device.

9. The storage device of claim 6, wherein:
the workload analyzer generates the device setting recommend information based on at least one of a result obtained by comparing a read performance measured in the workload pattern with a reference performance or a result obtained by comparing an available capacity of the host memory with a reference capacity, and
the device setting recommend information changes at least one of whether the map buffer is to be used or a size of the map buffer.

10. The storage device of claim 6, wherein:
the workload analyzer generates the device setting recommend information based on at least one of a result obtained by comparing a write performance measured in the workload pattern with a reference performance or a result obtained by comparing an available capacity of the main region with a reference capacity, and
the device setting recommend information changes at least one of whether the write buffer is to be used or a size of the write buffer.

11. The storage device of claim 6, wherein the workload analyzer generates the device setting recommend information to adjust a power level of the memory device, based on a result obtained by comparing a battery capacity measured in the workload pattern with a reference battery capacity.

12. The torage device of claim 5, wherein:
the buffer region includes memory cells storing n (n is a natural number greater than or equal to 1) data bits, and
the main region includes memory cells storing m (m is a natural number greater than or equal to n) data bits.

13. A method of operating a storage device, the method comprising:
transmitting a first request including device setting inquiry information to a host;

receiving a first response to the device setting inquiry information, that is acquired by the host from a user through a user interface of the host in response to the first request, from the host; and setting a device configuration of the storage device based on the first response, wherein the device setting inquiry information includes at least one of information on allocation of a map buffer in a host memory, information on allocation of a write buffer in a buffer region of the storage device, or information on a power level of the storage device.

14. The method of claim 13, wherein providing the first request includes providing the first request to the user when factory initialization or firmware update is performed.

15. The method of claim 13, wherein setting the device configuration includes setting at least one of whether the write buffer is to be used, a size of the write buffer, whether the map buffer is to be used, a size of the map buffer, or a power level of a Low Drop Out (LDO) regulator for supplying power to the storage device.

16. The method of claim 13, further comprising:
generating device setting recommend information to change the device configuration based on a result obtained by analyzing a workload pattern of the user;
providing the user with a second request including the device setting recommend information through the user interface; and
changing the device configuration based on a second response to the device setting recommend information acquired from the user through the user interface.

17. The method of claim 16, wherein, in the generating of the device setting recommend information, at least one of whether the map buffer is to be used and a size of the map buffer is changed based on at least one of a result obtained by comparing a read performance measured in the workload pattern with a reference performance and a result obtained by comparing an available capacity of the host memory with a reference capacity.

18. The method of claim 16, wherein generating the device setting recommend information includes generating the device setting recommend information to adjust the power level of the storage device based on a result, the result obtained by comparing a battery capacity measured in the workload pattern with a reference battery capacity.

19. The method of claim 16, wherein, in the generating of the device setting recommend information, at least one of whether the write buffer is to be used and a size of the write buffer is changed based on a first result or a second result, the first result obtained by comparing a write performance measured in the workload pattern with a reference performance and the second result obtained by comparing an available capacity of a main region of the storage device with a reference capacity.

20. A computing system comprising:
a host including a host memory and a user interface; and
a storage device including a controller and a memory device,
wherein the controller is configured to:
generate device setting information; and
provide the device setting information to the host,
wherein the host is configured to:
provide the device setting information through the user interface;
acquire a device setting response in response to the device setting information from a user through the user interface; and
provide the device setting response to the controller, and
wherein the controller is configured to:
receive the device setting response from the host;
change a firmware code based on the device setting response; and
transmit a device setting command based on the changed firmware code such that the memory device changes a device configuration based on the device setting command, the device configuration associated with allocation of a buffer region of the memory device or a power level control of the memory device.

* * * * *